US012579435B2

(12) United States Patent
Condurache et al.

(10) Patent No.: US 12,579,435 B2
(45) Date of Patent: Mar. 17, 2026

(54) METHOD FOR GENERATING A TRAINED CONVOLUTIONAL NEURAL NETWORK INCLUDING AN INVARIANT INTEGRATION LAYER FOR CLASSIFYING OBJECTS

(71) Applicant: Robert Bosch GmbH, Stuttgart (DE)

(72) Inventors: Alexandru Paul Condurache, Renningen (DE); Matthias Rath, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 776 days.

(21) Appl. No.: 17/999,646

(22) PCT Filed: May 26, 2021

(86) PCT No.: PCT/EP2021/064013
§ 371 (c)(1),
(2) Date: Nov. 22, 2022

(87) PCT Pub. No.: WO2021/239795
PCT Pub. Date: Dec. 2, 2021

(65) Prior Publication Data
US 2023/0206063 A1 Jun. 29, 2023

(30) Foreign Application Priority Data

May 27, 2020 (DE) ..................... 10 2020 206 631.0
Sep. 16, 2020 (DE) ..................... 10 2020 211 596.6

(51) Int. Cl.
*G06F 15/16* (2006.01)
*G06N 3/08* (2023.01)
*G06V 10/82* (2022.01)
(52) U.S. Cl.
CPC .............. *G06N 3/08* (2013.01); *G06V 10/82* (2022.01)

(58) Field of Classification Search
None
See application file for complete search history.

(56) References Cited

U.S. PATENT DOCUMENTS 11,551,433 B2 * 1/2023 Lee .......................... G06V 10/82
12,462,197 B1 * 11/2025 Flinn ....................... G06N 20/00
(Continued)

FOREIGN PATENT DOCUMENTS

CN 103093480 A 5/2013

OTHER PUBLICATIONS

Huang, et al.: "Computation of symmetry descriptor convolution integral," Computer Engineering and Applications, 44 (19), (2008), pp. 41-42.
(Continued)

*Primary Examiner* — Phuoc H Nguyen
(74) *Attorney, Agent, or Firm* — NORTON ROSE FULBRIGHT US LLP

(57) ABSTRACT

A method for generating a trained convolutional neural network including at least one invariant integration layer for classifying objects of a digital image of the surroundings of a mobile platform including a plurality of training cycles. Each training cycle includes: providing a digital image of the surroundings of a mobile platform including at least one object; providing a reference image associated with the digital image, the at least one object being labeled in the reference image; providing the digital image as an input signal of the convolutional neural network including at least one invariant integration layer; and adapting the convolutional neural network including at least one invariant integration layer in order to minimize a deviation of the classification from the particular associated reference image upon the classification of the at least one object of the digital image.

10 Claims, 1 Drawing Sheet

(56) References Cited

U.S. PATENT DOCUMENTS

| | | | |
|---|---|---|---|
| 2008/0123906 A1* | 5/2008 | Mori | G06V 40/193 |
| | | | 382/117 |
| 2011/0113294 A1 | 5/2011 | Chugg et al. | |
| 2016/0132789 A1* | 5/2016 | Flinn | G06N 3/045 |
| | | | 706/14 |
| 2018/0225550 A1* | 8/2018 | Jacobsen | G06F 18/214 |
| 2018/0293908 A1* | 10/2018 | Wang | G06F 18/214 |
| 2019/0205636 A1* | 7/2019 | Saraswat | G06N 3/044 |
| 2019/0325591 A1* | 10/2019 | Richard | G06T 7/42 |
| 2020/0382720 A1* | 12/2020 | Takagi | H04N 23/60 |

OTHER PUBLICATIONS

International Search Report for PCT/EP2021/064013, Issued Sep. 2, 2021.

Cheng et al., "RIFD-CNN: Rotation-Invariant and Fisher Discriminative Convolutional Neural Networks for Object Detection", 2016 IEEE Conference on Computer Vision and Pattern Recognition (2016) pp. 2884-2893.

* cited by examiner

140
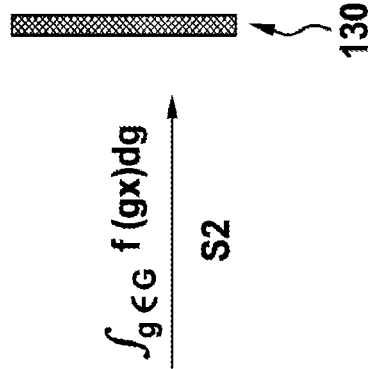
S3
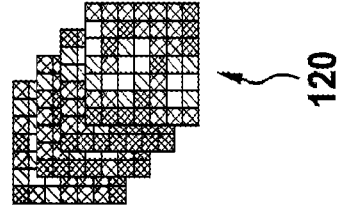
130
$$\int_{g \in G} f(gx)dg$$
S2
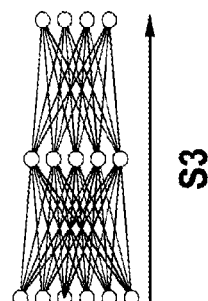
120
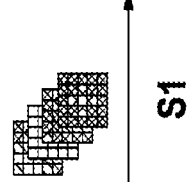
S1
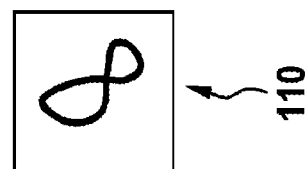
110

METHOD FOR GENERATING A TRAINED CONVOLUTIONAL NEURAL NETWORK INCLUDING AN INVARIANT INTEGRATION LAYER FOR CLASSIFYING OBJECTS

FIELD

The present invention relates to a method for generating a trained convolutional neural network including at least one invariant integration layer for classifying objects of a digital image of the surroundings of a mobile platform.

BACKGROUND INFORMATION

For a control of an at least semi-automated mobile platform, deep neural networks (DNN) may be used for various tasks including the classification of objects, for example, for recognizing and classifying surrounding road users, thus object recognition. The at least semi-automated mobile platform may then be controlled on the basis of the result of the object recognition.

DNNs have to be trained using a large amount of labeled data. The labeling of the data is work-intensive, difficult, and time-consuming, however. It is therefore important to increase the data efficiency during the training of DNNs, in order to reduce the amount of required labeled data to achieve the desired performance.

SUMMARY

According to aspects of the present invention, a method for generating a trained convolutional neural network including at least one invariant integration layer for classifying objects, a method for classifying objects in a two-dimensional digital image, a use of a convolutional neural network for classifying objects, a use of a convolutional neural network for providing a control signal, a convolutional neural network, a device, a computer program product, and a machine-readable memory medium are provided. Advantageous embodiments of the present invention are disclosed herein.

A method for generating a trained convolutional neural network including at least one invariant integration layer for classifying objects of a digital image of surroundings of a mobile platform including a plurality of training cycles is provided. In accordance with an example embodiment of the present invention, each training cycle includes the following steps:

In one step of the training cycle, a digital image of the surroundings of a mobile platform including at least one object is provided. In a further step of the training cycle, a reference image associated with the digital image is provided, the at least one object being labeled in the reference image. In a further step of the training cycle, the digital image is provided as an input signal of the convolutional neural network including at least one invariant integration layer. In a further step of the training cycle, the convolutional neural network including at least one invariant integration layer is adapted, in order, upon the classification of the at least one object of the digital image, to minimize a deviation of the classification from the respective associated reference image.

Convolutional neural networks may be used to classify objects of a digital image. Reference images, thus images in which the objects are labeled, are used for training such a network.

A neural network provides a framework for many different algorithms for machine learning, for cooperation, and for processing complex data inputs. Such neural networks learn to carry out tasks on the basis of examples, typically without having been programmed using task-specific rules.

Such a neural network is based on a collection of connected units or nodes, which are referred to as artificial neurons. Each connection may transfer a signal from one artificial neuron to another. An artificial neuron which receives a signal may process it and then activate further artificial neurons connected thereto.

In conventional implementations of neural networks, the signal at a connection of artificial neurons is a real number, and the output of an artificial neuron is calculated by a nonlinear function of the sum of its inputs. The connections of the artificial neurons typically have a weight which adapts with progressing learning. The weight increases or decreases the strength of the signal at a connection. Artificial neurons may include a threshold, so that a signal is only output if the total signal exceeds this threshold. A large number of artificial neurons is typically combined into layers. Different layers possibly carry out different types of transformations for their inputs. Signals travel from the first layer, the input layer, to the last layer, the output layer, possibly after passing through the layers multiple times.

The architecture of such an artificial neural network may be a neural network which is constructed according to a multilayer perceptron (MLP) network. A multilayer perceptron (MLP) network belongs to the family of artificial feed-forward neural networks. In principle, MLPs are made up of at least three layers of neurons: an input layer, an intermediate layer (hidden layer), and an output layer. This means that all neurons of the network are classified into layers, a neuron of one layer always being connected to all neurons of the next layer. There are no connections to the preceding layer and no connections which skip a layer. Except for the input layer, the different layers are made up of neurons which are subject to a nonlinear activation function and are connected to neurons of the next layer. A deep neural network may include many such intermediate layers.

Such convolutional neural networks have to be trained for their specific task. Each neuron of the corresponding architecture of the neural network receives, for example, a random starting weight. The input data are then put into the network and each neuron weights the input signals using its weight and outputs the result again to the neurons of the next layer. At the output layer, the overall result is then provided. The size of the error may be calculated, and the portion which each neuron had in this error, and then the weight of each neuron may be changed in the direction which minimizes the error. Recursive passes, renewed measurements of the error, and adaptation of the weights until the error is less than a predetermined limit then take place.

An invariant integration layer is a layer of the neural network which determines a group mean value matrix with the aid of an integration via a transformation group of the starting feature maps of the convolutional layer with the aid of an invariant function, the invariant integration layer being described in more detail hereinafter. Parameters of the invariant integration layer are also adapted upon the adaption of the convolutional neural network including the invariant integration layer.

Due to the use of convolutional neural networks including a novel layer of the convolutional neural network, which carries out an invariant integration, geometric prior knowledge is incorporated in that invariance properties of the objects to be classified, such as a rotation invariance and/or a translation invariance and/or a scaling invariance and/or an invariance to affine transformations, are explicitly ensured. The data efficiency is increased in that for the training of the neural network, less data are required for a defined accuracy and/or the accuracy is increased with equal number of data.

The use of this method thus enables the time and cost expenditure for labeling training data to be reduced, since the amount of the required labeled data may be reduced in order to achieve a desired performance of the neural network thus constructed.

The network layer described here including the invariant integration is differentiable, to thus enable the adaptation of the convolutional neural network with the aid of back propagation.

In this entire description of the present invention, the sequence of method steps is represented in such a way that the method is easily comprehensible. However, those skilled in the art will recognize that it is also possible to run through many of the method steps in another order and arrive at the same or a corresponding result. The order of the method steps may be changed accordingly in this meaning. Some features are provided with numerals to improve the readability or make the association more clear, however, this does not imply a presence of specific features.

According to one aspect of the method of the present invention, it is provided that the convolutional neural network including at least one invariant integration layer includes at least one convolutional layer and an invariant integration layer, and the invariant integration layer determines a group mean value matrix with the aid of an integration via a transformation group of the starting feature maps of the convolutional layer with the aid of an invariant function of the convolutional layer.

The group mean value matrix may be determined according to the following formula:

$$A[f](x) := \int_{g \in G} f(gx) dg$$

x: being a 3D tensor which includes the feature maps having the dimension: height×width×channels; f: being a vector made up of at least one function; g: being a transformation of the feature maps and g describing a single transformation from transformation group G. Group mean value A being defined by integration of an invariant function f via transformations $g \in G$, which acts on input space x.

The invariant integration layer is thus used on a group-equivariant neural network feature space, which is calculated with the aid of equivariant convolutional layers.

The expert knowledge about invariances, for example, a rotation invariance and/or a translation invariance and/or a scaling invariance and/or an invariance to affine transformations, may thus be introduced via transformation group G with regard to a present problem.

Group theory forms the foundation of invariant integration. A group G is a mathematical abstraction, which is made up of a set of elements on which an operation acts under the axioms of closure, associativity, identity element, and reversibility.

A function f is considered equivariant with respect to a group G of transformations if it is possible to determine an accurate relationship between transformations $g \in G$ of input x (the feature maps as a plurality; feature space) of the function and a corresponding transformation $g' \in G$ of the output of the function, the apostrophe indicating that the transformation of the output is not precisely equal to that of input x;

The mathematical definition of equivariance results as:

$$f(gx) = g'f(x) \forall x \in X$$

with f: vector including at least one invariant or equivariant function; f(x) the equivalent feature space; x: 3D tensor, which includes the feature maps. Height×width×channels; g: transformation of the feature maps; g': transformation of the output values of the function.

With equivariant functions, the output transformation is predeterminable; with invariant functions, it is the identity (for example, a 1 in the case of multiplication). The mathematical definition of invariance therefore results as:

$$f(gx) = f(x) \forall x \in X$$

One example of an equivariant function is the convolutional layer which is equivariant to translations. In practice, we are also interested in imposing the invariance for transformation groups other than translations, e.g., rotations, scalings, or affine transformations. The invariant integration is an algorithm for construction of a complete feature space with respect to a symmetrical transformation.

A feature space is considered completely defined if all patterns which are equivalent with respect to a transformation group G are mapped on the same point in the feature space while all different patterns are mapped on different points. This means that a complete feature space is invariant with respect to transformations $g \in G$ of the input signal.

The input features may be normalized for this purpose, the channel-wise minimum being used, which is determined during the training.

$$x_i = \max(\varepsilon, x_i - x_{min} + 1), \text{ with } 0 < \varepsilon << 1$$

This prevents the gradient of the exponents and inputs of the invariant integration layer from disappearing, due to which the use of the back propagation algorithm is enabled.

According to one aspect of the method of the present invention, it is provided that invariant function f is a monomial of the output feature maps of the convolutional layer.

A monomial is a special form of a polynomial which is only made up of one element and is defined as follows:

$$f(x) = m(x) = \prod_{i=1}^{K} x_i^{b_i} \text{ with } \sum_i b_i \le |G|,$$

x: being a 3D tensor, which includes the feature maps having the dimension: height×width×channels; f: being a vector including at least one function; m: being the monomial; g: being a transformation of the feature maps and g being a single transformation from the transformation group G; K: being a monomial order, thus the dimension of the input feature; being a monomial exponent, which is adapted during the adaptation of the neural network.

For invariant function f, the set of all possible monomials m(x) represents a good selection for generating a complete feature space.

It is possible to show in group theory that upon the use of monomials in invariant integration, transformation-invariant features are suppressed by the invariant integration, and thus the differences of features which are transformation invariant to other features are amplified.

The upper limit for the number of all possible monomials is $$\binom{K + |G|}{K},$$

but these are not all calculated, since it is an enormously high value. Coefficients bi are trained during the training of the neural network.

According to one aspect of the method of the present invention, it is provided that the transformation is a rotation and/or translation.

The group mean value matrix or the group mean value vector may be determined according to the following formula here:

$$A[f](x) =$$

$$\sum_u \sum_v \int_\phi m(x(u, v; \phi))d\phi = \sum_u \sum_v \int_\phi \prod_{i=1}^{K} x(u + d_{u,i}\sin(\phi), v + d_{v,i}\cos(\phi))^{b_i} d\phi$$

x: being a 3D tensor, which includes the feature maps having the dimension: height×width×channels; f: being a vector including at least one function; g: being a transformation of the feature maps and g being a single transformation from transformation group G; K: being a monomial order; u, v: being a pixel position on a feature map; $d_i$: being a monomial distance; $b_i$: being a monomial exponent, which is adjusted during the adaptation of the neural network; and $\phi$: describing a rotational angle.

According to one aspect of the method of the present invention, it is provided that the transformation is a rotation and/or translation and/or scaling.

The group mean value matrix or the group mean value vector may be determined according to the following formula:

$$A[f](x) = \sum_u \sum_v \int_\phi \int_s m(x(u, v; \phi; s))d\phi ds =$$

$$\sum_u \sum_v \int_\phi \int_s \prod_{i=1}^{K} x(u + s*d_{u,i}\sin(\phi), v + s*d_{v,i}\cos(\phi))^{b_i} d\phi$$

x: being a 3D tensor, which includes the feature maps having the dimension: height×width×channels; f: being a vector including at least one function; g: being a transformation of the feature maps and g being a single transformation from transformation group G; K: being a monomial order; u, v: being a pixel position on a feature map; $d_i$: being a monomial distance; $b_i$: being a monomial exponent, which is adjusted during the adaptation of the neural network; $\phi$: describing a rotational angle; and s: describing a scaling factor.

The invariant integration layer calculates the group mean value in order to explicitly force an invariant feature space using a set of monomials m(x), for example, by integration via the group of two-dimensional translations u, v, scalings s, and rotations φ. The group average may be calculated using monomials for an arbitrary transformation group G.

It advantageously results from this invariant integration layer that an object recognition is invariant with respect to a rotation, scaling, and a translation of the relevant objects. For example, from the bird's eye perspective, a vehicle is thus independent of its alignment on the digital image in the object classification.

According to one aspect of the method of the present invention, it is provided that invariant integration A(x) is determined by the relationships described in Formula 1:

$$A(x)=\Sigma_u \Sigma_v \int_\phi \Pi_{i=1}^{K} x(u+d_{u,i} \sin(\phi), v+d_{v,i} \cos(\phi))^{b_i} d\phi \qquad (1)$$

the parameters as above describing: K: being a monomial order; u, v: being a pixel position on a feature map; $d_i$: being a monomial distance; $b_i$: being a monomial exponent; x: being a 3D tensor, which includes the feature maps; and $\phi$: being a rotational angle.

According to one aspect of the method of the present invention, it is provided that invariant integration A(x) is determined by the relationships described in Formula 2:

$$A(x)=\Sigma_u \Sigma_v \int_\phi \int_s \Pi_{i=1}^{K} x(u+s*d_{u,i} \sin(\phi), v+s*d_{v,i} \cos(\phi))^{b_i} d\phi ds \qquad (2)$$

the parameters as above describing: K: being a monomial order; u, v: being a pixel position on a feature map; $d_i$: being a monomial distance; $b_i$: being a monomial exponent; x: being a 3D tensor, which includes the feature maps; $\phi$: being a rotational angle; and s being a scaling factor.

According to one aspect of the method of the present invention, it is provided that the monomial is parameterized and the parameters of the monomial are randomly generated and optimized parameters are selected from the randomly generated parameters. The parameters of the monomials, i.e., the orders, the distances, and the exponents, are selected with the aid of an iterative approach.

If M monomials are required (for example, M=5), thus, M+1 (for example, 6) parameter combinations are randomly selected. For each of the M+1 possible combinations made up of M parameters, a linear classifier and its validation accuracy is calculated. The parameter combination which was not used in the best-performing classifier is discarded and replaced by a new, randomly selected combination. This procedure is repeated a certain number (for example, 100 times) of steps to find the best possible M parameter combinations.

This method for selecting the parameters of the monomials, i.e., the orders, the distances, and the exponents, is easy and fast.

Alternatively, according to an example embodiment of the present invention, the parameters of the monomials, i.e., the orders, the distances, and the exponents, are selected with the aid of a pruning approach. If M monomials are required (for example, M=5), thus, N>M (for example, 100) parameter combinations are randomly selected. The neural network is pre-trained with the aid of the N monomials and with the aid of a pruning method, the N parameter combinations which provide the greatest contribution to the correct classification of the network are determined either directly or iteratively. The contribution of the classification may be determined, for example, by the sum of the absolute values of the weights at the output of a monomial. This method for selecting the parameters of the monomials, i.e., the orders, the distances, and the exponents, is easy, fast, and enables direct end-to-end training of the network.

According to one aspect of the method of the present invention, it is provided that the convolutional neural network includes a plurality of convolutional layers which highlight features relevant for the classification of the object, before the invariant integration layer determines a group mean value matrix. Features relevant for the object classification are thus highlighted.

This method of extraction for the classification of relevant features reduces the computing time for calculating the invariant integration. For example, items of information, which are not relevant for the classification, about a translation and/or colors of the objects are discarded.

According to an example embodiment of the present invention, a method for classifying objects in a digital image, in particular a two-dimensional digital image, of the surroundings of a mobile platform is provided, which includes the following steps:

In a first step, the digital image of the surroundings of the mobile platform is provided. In a further step, the digital image is classified according to a plurality of object classes with the aid of a trained convolutional neural network including at least one invariant integration layer according to one of the above-described methods and the digital image as the input signal of the convolutional neural network including at least one invariant integration layer, the convolutional neural network including at least one invariant integration layer having been trained, with the aid of a plurality of digital reference images and classified objects of the particular digital reference images, to classify objects of the digital reference images with respect to the plurality of object classes; and classifying the objects of the digital image.

Such a method for classifying objects is suitable in particular for at least semi-automated mobile platforms, for example, for an autonomous vehicle.

According to an example embodiment of the present invention, a use of a convolutional neural network including at least one invariant integration layer for classifying objects in digital images of the surroundings of a mobile platform is provided, which was trained according to one of the above-described methods.

Because the invariant integration layer is part of the convolutional neural network, the advantage of higher accuracy as was already stated above results and less labeled data are required to meet a certain accuracy of the classification task.

According to an example embodiment of the present invention, a use of the convolutional neural network including at least one invariant integration layer, which was trained according to one of the above-described methods, for classifying objects in digital images of the surroundings of a mobile platform is provided, based on the result of the classification, a control signal being provided for activating an at least semi-automated mobile platform and/or based on the result of the classification, a warning signal for warning an occupant of an at least semi-automated mobile platform being provided.

The term "based on" is to be understood broadly with respect to the feature that a control signal is provided based on the result of the classification. It is to be understood in such a way that any type of determination or calculation of a control signal is used as a function of the result of the classification, this not precluding still other input variables also being used for this determination of the control signal. This applies accordingly to the provision of a warning signal.

The possibility advantageously results from the classification of objects of the surroundings of an at least semi-automated mobile platform of making the control of the mobile platform dependent on the classified and detected object, for example, to avoid an accident.

According to one aspect of the present invention, a convolutional neural network including at least one invariant integration layer is specified, which was trained according to one of the above-described methods.

Using such a convolutional neural network, the described classification task may be integrated easily in different systems.

According to one aspect of the present invention, a device is specified which includes a convolutional neural network including at least one invariant integration layer, which was trained according to one of the above-described methods.

Using such a device, the corresponding method may be integrated easily in different systems.

According to one aspect of the present invention, a computer program is specified which includes commands which, upon the execution of the computer program by a computer, prompt it to carry out one of the above-described methods. Such a computer program enables the use of the described method in different systems.

According to an example embodiment of the present invention, a machine-readable memory medium is specified, on which the above-described computer program is stored. The above-described computer program is transportable with the aid of such a machine-readable memory medium.

A mobile platform may be understood as an at least semi-automated system, which is mobile, and/or a driver assistance system. One example may be an at least semi-automated vehicle or a vehicle including a driver assistance system. That means, in this context an at least semi-automated system includes a mobile platform with respect to an at least semi-automated functionality, but a mobile platform also includes vehicles and other mobile machines including driver assistance systems. Further examples of mobile platforms may be driver assistance systems including multiple sensors, mobile multisensor robots, for example, robot vacuum cleaners or lawnmowers, a multisensor monitoring system, a manufacturing machine, a personal assistant, or an access control system. Each of these systems may be a completely or semi-automated system.

According to an example embodiment of the present invention, a device is specified which is configured to carry out one of the above-described methods. With the aid of such a device, it is possible to make the above-described methods available, for example, for installation in a mobile platform.

According to an example embodiment of the present invention, a computer program is specified which includes commands which, upon the execution of the program by a computer, prompt it to carry out one of the above-described methods. With the aid of such a computer program, the above-described methods may be made available easily, for example, to a mobile platform.

According to an example embodiment of the present invention, a machine-readable memory medium is specified, on which the above-described computer program is stored. The above-described computer program product is transportable with the aid of such a machine-readable memory medium.

BRIEF DESCRIPTION OF THE DRAWING

An exemplary embodiment of the present invention is described with reference to FIG. 1 and explained in greater detail hereinafter.

FIG. 1 shows a method for classifying objects of a digital image of the surroundings of a mobile platform using a trained convolutional neural network including at least one invariant integration layer.

DETAILED DESCRIPTION OF EXAMPLE EMBODIMENTS

FIG. 1 schematically shows how an image 110 is transferred in a step S1 using a number of convolutional layers of the neural network including an invariant integration layer into feature maps 120. In step S2, the invariant integration is carried out via feature maps 120 and a group mean value vector 130 is created. The fully connected layers of the convolutional neural network including an invariant integration layer adjoining thereon then result with step S3 in classification vector 140, from which the corresponding classification result of the object is to be read.

An architecture of an invariant neural network for classification is typically constructed from 2 parts. The first part is a sequence of equivariant layers for downsampling the signal toward lower resolutions, with the goal of obtaining the desired information and discarding redundant information. Due to the equivariance of the layers, the output of the convolutional layers changes predictably when the input of the layer is transformed in a predetermined manner (for example, rotation).

In the second part, the equivariant feature space is transferred into an invariant feature space, which does not change upon transformation of the input. The invariant integration layer is used for this purpose. On the basis of the features obtained in this manner, multiple fully-connected layers are used to obtain a classification result.

One example of an architecture of the invariant neural network is set forth in Table 1. The part for the equivariant feature acquisition is made up of d layers of successive equivariant convolutions (for example, d=6) having kernel sizes N1 to N_d (for example, N1=24, N2=32, . . . ). Between the layers, ReLU, BatchNormalizing, and MaxPooling are used.

The invariant integration layer uses 5 monomials to transfer the equivariant feature space into an invariant one-dimensional feature vector. On this basis, k fully-connected blocks including neurons M1 to M_k (for example, M1=90, M2=90) are used to obtain classification scores from the invariant features.

TABLE 1

| structure of an invariant network for classification |
| --- |
| Input signal: 28 × 28 × 1 images |
| 24 equivariant conv 9 × 9. ReLU. BatchNorm. |
| 32 equivariant conv 7 × 7. ReLU. BatchNorm. |
| MaxPool, Stride 2. |
| 36 equivariant conv 7 × 7. ReLU. BatchNorm. |
| 36 equivariant conv 7 × 7. ReLU. BatchNorm. |
| MaxPool, Stride 2. |
| 64 equivariant conv 7 × 7. ReLU. BatchNorm. |
| 96 equivariant conv 5 × 5. ReLU. BatchNorm. |
| ReLU. Invariant Integration Layer, 5 monomials. |
| Fully Connected Layer, 90 neurons. ReLU. |
| BatchNorm. |
| Fully Connected Layer, 90 neurons. ReLU. |
| BatchNorm. |
| Fully Connected Layer 10 neurons. Softmax. |

The monitored training of a neural network uses a training set of input signals and desired output signals (known as "ground truth") of the convolutional neural network including an invariant integration layer. The desired output signals may be, for example, classification labels. As a function of the actual output values of the convolutional neural network including an invariant integration layer and the desired output signals, a so-called loss function is calculated, which is to be optimized, i.e., the parameters or weights of the convolutional neural network including an invariant integration layer, which are calculated to optimize the loss function. The optimization is carried out by calculating the gradients of the loss function using the weights, which may be carried out by iterative application of the chain rule. This method is also referred to as back propagation.

In order that the invariant integration layer may be used within a deep neural network and the preceding layers remain optimizable with the aid of the back propagation algorithm, the monomials have to be derivable with respect to their input data. This derivation is calculated as:

$$\frac{\delta\, m(x)}{\delta\, x_j} = b_j x_j^{b_j-1} \prod_{i=1,i\neq j}^{K} x_i^{b_i}$$

It is apparent that the values have to be $x_i\neq0$, so that the gradient does not "disappear" (i.e., go to 0), which would prevent training of the preceding layers.

Furthermore, it may be shown that the derivation is also defined with respect to monomial exponents $b_i$. These may therefore be optimized during the training process of the neural network.

$$\frac{\delta\, m(x)}{\delta\, b_j} = \log(x_j) x_j^{b_j} \prod_{i=1,i\neq j}^{K} x_i^{b_i}$$

It is also important here that all values are $x_i\neq0$, since otherwise, on the one hand, the logarithm is not defined, and on the other hand, the gradient of the product would disappear again. The above-mentioned displacement of the feature maps is therefore used:

$$\tilde{x}=\max(\in,x-x_{min}+1)$$

What is claimed is:

1. A method for generating a trained convolutional neural network including at least one invariant integration layer for classifying objects of a digital image of surroundings of a mobile platform using a plurality of training cycles, each training cycle of the training cycles comprising the following steps:

providing a digital image of surroundings of a mobile platform including at least one object;

providing a reference image associated with the digital image, the at least one object being labeled in the associated reference image;

providing the digital image as an input signal of the convolutional neural network including at least one invariant integration layer which carries out an invariant integration; and adapting the convolutional neural network including at least one invariant integration layer to minimize a deviation of a classification of the at least one object of the digital image from the associated reference image, when classifying the at least one object of the digital image;

wherein the invariant integration A (x) is determined by the relationships described in the following formula 1:

$$A(x)=\Sigma_u\Sigma_v\int_\phi \Box\Pi_{i=1}^{K} x(u+d_{u,i}\sin(\phi),v+d_{v,i}\cos(\phi))^{b_i}d\phi \qquad (1)$$

K: being a monomial order: u, v: being a pixel position on a feature map; $d_i$: being a monomial distance; $b_i$: being a monomial exponent; x: being a 3D tensor which encompasses the feature maps; and φ: being a rotational angle.

2. The method as recited in claim 1, wherein the convolutional neural network including at least one invariant integration layer includes at least one convolutional layer and an invariant integration layer, and the invariant integration layer determines a group mean value matrix using an integration via an invariant function of a transformation of output feature maps of the convolutional layer.

3. The method as recited in claim 2, wherein the invariant function is a monomial of the output feature maps of the convolutional layer.

4. The method as recited in claim 2, wherein the transformation is a rotation and/or a translation.

5. The method as recited in claim 3, wherein the monomial is parameterized and parameters of the monomials are randomly generated and optimized parameters are selected from the randomly generated parameters.

6. The method as recited in claim 1, wherein the convolutional neural network includes a plurality of convolutional layers, which highlight features relevant for the classification of the object before the invariant integration layer determines a group mean value matrix.

7. A method for classifying objects in a two-dimensional digital image of surroundings of a mobile platform, comprising the following steps:

providing the digital image of the surroundings of the mobile platform;

classifying the digital image according to a plurality of object classes using a trained convolutional neural network including at least one invariant integration layer and the digital image as an input signal of the convolutional neural network including at least one invariant integration layer, the convolutional neural network including at least one invariant integration layer having been trained, using a plurality of digital reference images and classified objects of the digital reference images, to classify objects of the digital reference images with respect to the plurality of object classes; and classifying objects of the digital image;

wherein the convolutional neural network including at least one invariant integration layer is trained using a plurality of training cycles, each training cycle of the training cycles including the following steps:

providing a first digital image of surroundings of a mobile platform including at least one object, providing a reference image, of the plurality of reference images, associated with the first digital image, the at least one object being labeled in the associated reference image, providing the first digital image as an input signal of the convolutional neural network including at least one invariant integration layer which carries out an invariant integration, and adapting the convolutional neural network including at least one invariant integration layer to minimize a deviation of a classification of the at least one object of the first digital image from the associated reference image, when classifying the at least one object of the first digital image;

wherein the invariant integration $A(x)$ is determined by the relationships described in the following formula 1:

$$A(x) = \Sigma_u \Sigma_v \int_\phi \square \Pi_{i=1}{}^K x(u + d_{u,i} \sin(\phi), v + d_{v,i} \cos(\phi))^{b_i} d\phi \qquad (1)$$

K: being a monomial order; u, v: being a pixel position on a feature map; $d_i$: being a monomial distance; $b_i$: being a monomial exponent; x: being a 3D tensor which encompasses the feature maps; and $\phi$: being a rotational angle.

8. The method as recited in claim 7, wherein, based on the result of the classification of the objects, providing: a control signal for activating an at least semi-automated mobile platform and/or a warning signal for warning an occupant of an at least semi-automated mobile platform.

9. A device including a computer and a non-transitory machine readable storage medium on which is stored a trained convolutional neural network for execution by the computer, the trained convolutional neural network including at least one invariant integration layer, wherein the convolutional neural network including at least one invariant integration layer is trained for classifying objects of a digital image of surroundings of a mobile platform using a plurality of training cycles, each training cycle of the training cycles comprising the following steps:

providing a digital image of surroundings of a mobile platform including at least one object;

providing a reference image associated with the digital image, the at least one object being labeled in the associated reference image;

providing the digital image as an input signal of the convolutional neural network including at least one invariant integration layer which carries out an invariant integration; and adapting the convolutional neural network including at least one invariant integration layer to minimize a deviation of a classification of the at least one object of the digital image from the associated reference image, when classifying the at least one object of the digital image;

wherein the invariant integration $A(x)$ is determined by the relationships described in the following formula 1:

$$A(x) = \Sigma_u \Sigma_v \int_\phi \square \Pi_{i=1}{}^K x(u + d_{u,i} \sin(\phi), v + d_{v,i} \cos(\phi))^{b_i} d\phi \qquad (1)$$

K: being a monomial order; u, v: being a pixel position on a feature map; $d_i$: being a monomial distance; $b_i$: being a monomial exponent; x: being a 3D tensor which encompasses the feature maps; and $\phi$: being a rotational angle.

10. A non-transitory machine-readable memory medium on which is stored a computer program for generating a trained convolutional neural network including at least one invariant integration layer for classifying objects of a digital image of surroundings of a mobile platform using a plurality of training cycles, the computer program, when executed by a computer, causing the computer to perform the training cycles, each training cycle of the training cycles comprising the following steps:

providing a digital image of surroundings of a mobile platform including at least one object;

providing a reference image associated with the digital image, the at least one object being labeled in the associated reference image;

providing the digital image as an input signal of the convolutional neural network including at least one invariant integration layer which carries out an invariant integration; and adapting the convolutional neural network including at least one invariant integration layer to minimize a deviation of a classification of the at least one object of the digital image from the associated reference image, when classifying the at least one object of the digital image;

wherein the invariant integration $A(x)$ is determined by the relationships described in the following formula 1:

$$A(x) = \Sigma_u \Sigma_v \int_\phi \square \Pi_{i=1}{}^K x(u + d_{u,i} \sin(\phi), v + d_{v,i} \cos(\phi))^{b_i} d\phi \qquad (1)$$

K: being a monomial order; u, v: being a pixel position on a feature map; $d_i$: being a monomial distance; $b_i$: being a monomial exponent; x: being a 3D tensor which encompasses the feature maps; and $\phi$: being a rotational angle.

* * * * *